Nov. 23, 1965   J. P. ANDERSON ETAL   3,218,936
SERVO VALVE FEEDBACK SYSTEM
Filed Aug. 22, 1963
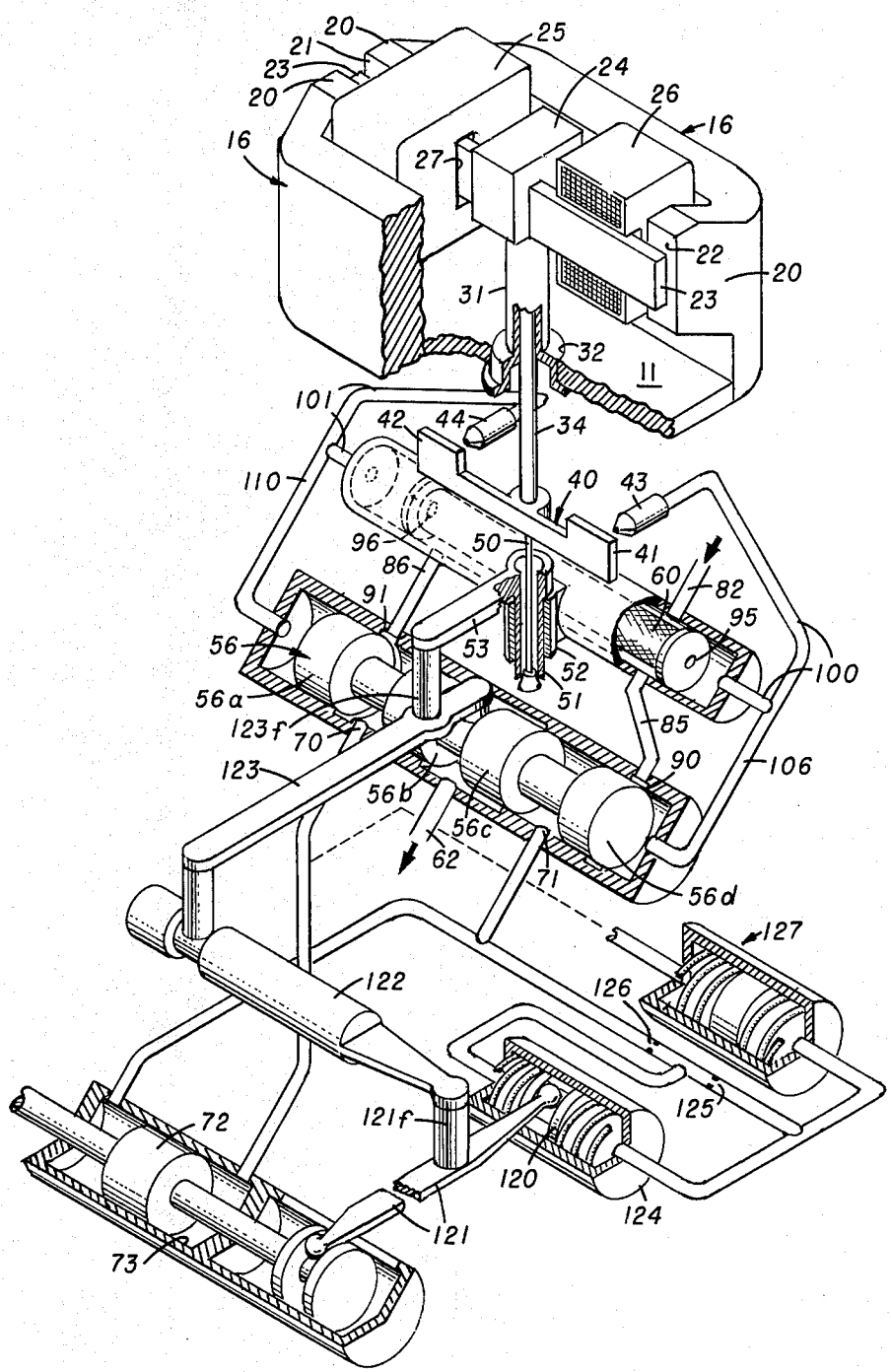

United States Patent Office 3,218,936
Patented Nov. 23, 1965

3,218,936
SERVO VALVE FEEDBACK SYSTEM
John P. Anderson, Sepulveda, and Robert K. Van Ausdal, La Crescenta, Calif., assignors to The Bendix Corporation, North Hollywood, Calif., a corporation of Delaware
Filed Aug. 22, 1963, Ser. No. 303,737
8 Claims. (Cl. 91—365)

This invention relates to servo valves of the type in which a sensitive input-signal-actuated first stage or pilot valve controls the application of pressure fluid to a hydraulically actuated second stage valve which in turn controls the application of pressure fluid to an actuating or load motor (hereinafter sometimes referred to simply as the motor) which performs a desired power function in response to the input signals.

Such servo valves are broadly old. Some do not employ feedback, but, instead, employ centering springs urging the second stage valve into neutral position, so that the valve movement and the resultant flow of hydraulic fluid to the motor is at least roughly proportional to the magnitude of the input signal. This controls the speed of the motor but not the distance through which it moves, i.e., its limit or end position.

Other prior valves employ some sort of spring feedback from the second-stage valve (sometimes herein referred to as a valve spool) to the pilot valve to apply to the pilot valve a force proportional to the movement of the spool and in opposition to the input signal. This also controls the speed of the motor but not its limit or end position.

Still other prior valves employ both feedback from the spool to the pilot valve to control the speed of the motor in accordance with the strength of the input signal, and independent feedback from the motor to the pilot valve to stop the motor after movement through a distance proportional to the magnitude of the input signal.

An object of the present invention is to refine and improve feedback systems, and make them more practical and versatile.

The present system differs from the prior systems described in that different feedback movements (such as the movements of the spool and motor) are combined by a differential mechanism and the resultant movement applied to the pilot valve. The new arrangement has the following advantages over the prior art in which two separate feedback paths were employed from the spool and the motor respectively:

(a) In the prior art structures it was necessary to employ separate low rate springs as feedback coupling links from the spool and motor respectively to the pilot stage, and these springs had to be very delicately balanced with respect to each other in order to combine the two forces in desired relation.

(b) It has been found that systems in accordance with the present invention are less subject to cross coupling between feedbacks inherent in the high gain feedback paths than the systems of the prior art type.

(c) The present system can be extended to combine more than two feedback signals without difficulty.

The invention may be used to provide a servo system utilizing hydraulic pressure fluid as the power source, which system is capable of moving an output load accurately in accordance with relatively weak control signals despite the existence within the system of mechanical resonance within the frequency range of the control signals. As will be shown later, this is accomplished by feeding back to the pilot stage, in addition to the feedback signal from the motor and/or second stage valve, a signal derived from pressures resulting from the said mechanical resonance.

A thorough understanding of the invention may be had from the following description with reference to the drawing, in which the single figure is a schematic perspective view of a system incorporating the invention as applied to a particular type of servo valve.

The drawing shows the present invention applied to the servo valve construction of U.S. Patent 3,095,002, the present drawing being generally similar to FIG. 4 of the patent, to which reference is made for details not described herein.

Briefly the features common to the present disclosure and that of the prior patent include the following and are identified by the same reference numbers.

An electric motor responsive to input signals is shown as comprising a pair of ferromagnetic frame members 16, 16 which are oppositely magnetized by a pair of permanent magnets (not shown) interconnecting them. Each of the frame members 16, 16 has a pair of arms 20, 20 terminating in a pair of pole faces 21 and 22 respectively. The two pole faces of each member 16 are of the same polarity, but the juxtaposed pole faces on the other frame members are of opposite polarity. An armature 23 of ferromagnetic material is centrally supported by a member 24 and has its opposite ends extending therefrom through openings 27 in a pair of signal coils 25 and 26 respectively into mid-position in the gaps between the pole faces of opposite polarities on the respective frame members 16, 16. A signal current applied to the coils 25 and 26 in aiding relation magnetizes the armature 23, and the resultant magnetic forces between the armature ends and the pole faces 21, 21 and 22, 22 tend to rotate the armature about its center. Limited rotation in response to such forces is permitted by mounting the armature-supporting member 24 on the upper end of a thin torque tube 31, the lower enlarged end 32 of which is anchored (in sealing relation) to a stationary wall 11 which isolates the upper, electric motor structure from the lower, hydraulic portion of mechanism. The limited rotation of the armature is transmitted by a rigid shaft 34 (extending through the torque tube 31) to a baffle plate 40, the opposite ends 41 and 42 of which oppositely control the flow of hydraulic fluid from a pair of nozzles 43 and 44 respectively. The nozzles are supplied with pressure fluid from a common source pipe 82, through a common filter 60, separate pressure dropping orifices 95 and 96 respectively and separate pipes 100 and 101 respectively.

The pressure in pipe 100 is transmitted by a pipe 106 to one end of a valve spool 56, and the pressure in pipe 101 is transmitted by a pipe 110 to the other end of the valve spool, so that the spool tends to move in response to a pressure differential between pipes 100 and 101 engendered by movement of the flapper or baffle plate 40 in response to electric signals.

The valve spool 56 has four lands 56a, 56b, 56c and 56d which cooperate with a pair of pressure ports 90, 91, a return pipe 62, and a pair of cylinder ports 70 and 71 to create a pressure differential across a load piston 72 (sometimes referred to as the load motor) in a cylinder 73 in response to movement of the valve spool 56 out of neutral (center) position.

In common with the prior patent, there is also provided a feedback arm 53 essentially rigid and extending radially from the upper end of an essentially rigid sleeve 51 which is rotatably supported in a bearing 52 and is secured at its lower end to a small inner shaft 50 extending downward from the shaft 34 below the baffle 42. The shaft 50 has torsional elasticity and functions as a spring to impart to the baffle plate 42 and armature 23 a torque proportional to movement of the feedback arm 53. In the prior patent the outer end of the feedback arm 53 engaged the valve spool 56 for actuation solely thereby to apply feedback forces to the baffle plate and armature.

*Improvements constituting the present invention*

The present invention resides in a mechanism for the combination of a plurality of forces to produce a single resultant feedback applied to the first stage valve (the flapper or baffle plate valve 42) in opposition to the electrical input signal. One example is shown in the drawing in which the feedback signal is a combination of forces derived from:

(1) The movement of the valve spool 56,
(2) The movement of the load motor 72,
(3) Transient pressure differentials in the system that result from natural resonant conditions of the load and its supporting structure and cause transient errors in load position.

The apparatus for combining the various forces is a system of links and levers.

The system element movable in response to transient pressure differentials is a piston 120, the pressure actuation of which will be explained later. The movement of this piston 120 is combined with the movement of the load motor 72 by a first differential lever 121, the fulcrum 121$f$ of which is connected by a link 122 to one end of a second differential lever 123 the other end of which engages the valve spool 56 for movement thereby, and the fulcrum 123$f$ of which is pivotally connected to the free end of the feedback arm 53.

The relative effects of the three different movements on the arm 53 may be controlled by choice of the position of the fulcrum 121$f$ on the lever 121 and choice of the position of the fulcrum 123$f$ on the lever 123. In the example shown, the end of the lever 121 connected to the piston 120 is much shorter than the end connected to the load piston 72 because the latter has a longer travel than the piston 120. Likewise, the range of movement of the valve spool 56 between no flow and full flow conditions is small compared to the movement of the fulcrum 121$f$, so the fulcrum 123$f$ of the lever 123 is located closer to the valve spool 56 than to the link 122. This use of different lever dimensions provides great flexibility of design.

Considering the forces to which the differential pressure piston 120 is responsive, this piston is spring-centered in a cylinder 124 the opposite ends of which are connected across (in shun to) an orifice 125. Orifice 125 is connected in series relation with an orifice 126 and a hydraulic high-pass filter 127 between the opposite ends of the load cylinder 73. As shown, the filter 127 is a cylinder containing a spring-centered piston which blocks any long continued flow in either direction and thereby eliminates load by-pass flow losses at static operating conditions, while permitting rapid response to high frequency fluctuations in the pressure across the motor piston 72 to which the mass of filter 127 and its springs are tuned. The tuned frequency flow permitted by the filter 127 produces a pressure differential across the differential piston 120 which is a function of the pressure drop across the orifice 125 and can be controlled by choice of the relative sizes of the orifices 125 and 126 respectively.

The response of the piston 120 can be further influenced by selecting centering springs of the proper stiffness and rate.

The overall result is that the motions of the piston 120 (responsive to certain frequency load pressure changes) and of the load motor 72 are summed mechanically and fed to the long end of the differential lever 123 which mechanically sums this movement with the movement of the valve spool 56 and feeds back the resultant movement through the torsion spring 50 to the pilot motor armature 23.

Under dynamic load conditions to which the filter 127 is tuned the feedback from the differential pressure piston 120 tends to close (center) the valve spool 56 and create the effect of artificial load damping. This is obtained without sacrificing static stiffness because of the presence of the high-pass filter 127 which eliminates the effect of pressure feedback at steady state conditions.

Although for the purpose of explaining the invention a particular embodiment thereof has been shown and described, obvious modifications will occur to a person skilled in the art, and we do not desire to be limited to the exact details shown and described.

We claim:

1. A servo valve mechanism comprising:
   a first stage comprising two output lines and a pilot valve having a control signal input means and a separate feedback signal input means for inversely varying the pressures in said two output lines proportional to the difference between control and feedback signals applied to said pilot valve;
   a second stage connected to said output lines and comprising a hydraulic motor and means including a hydraulically actuated valve movable in response to different pressures in said two output lines for delivering to said motor hydraulic fluid at a flow rate proportional to the difference between the said pressures in said output lines;
   and differential means for applying to said feedback signal input means of said first stage an inverse feedback signal proportional to the sum of the movements of at least two movable elements, at least one of which moves in response to pressure differences in said two output lines.

2. Apparatus according to claim 1 in which said feedback signal input means in said first stage comprises a spring link for applying to said pilot valve a force proportional to movement imparted to said link, and said differential means comprises a differential lever mechanism having a fulcrum connected to said spring link and two parts spaced from said fulcrum and from each other connected respectively to said two movable elements.

3. Apparatus according to claim 1 in which one of said movable elements in said second stage is said hydraulic motor.

4. Apparatus according to claim 1 in which one of said movable elements in said second stage is said hydraulically actuated valve.

5. Apparatus according to claim 1 in which one of said two movable elements in said second stage is said hydraulic motor and the other movable element is said hydraulically actuated valve.

6. A servo valve system comprising:
   a pilot valve responsive to control signals;
   a hydraulically actuated second stage valve controlled by said pilot valve to move in an opening direction in response to control signals applied to said pilot valve;
   a hydraulic motor controlled by said second stage valve for movement at a speed proportional to the extent of opening movement of the second stage valve;
   feedback means including a torsion spring connected to said pilot valve for applying inverse feedback signals to said pilot valve independently of control signals applied thereto comprising mechanical input means on the torsion spring and mechanical differential means having an output connected to said mechanical input means and having two mechanical input elements;
   means for moving said two input elements independently in response to respective movements of different parts resulting from actuation of said pilot valve by a control signal.

7. A servo valve system comprising:
   a hydraulic motor;
   a valve hydraulically connected to said motor with a pair of motor pipes for creating a pressure differential between said pipes to actuate said motor in response to movement of the valve;

means for moving said valve including a signal-actuated rotatable shaft and a feedback-actuated torsion spring connected to said rotatable shaft;

a first feedback means movable in response to a first force in one portion of the system including said motor and valve;

a second feedback means movable in response to a second force in another portion of the system;

a differential mechanism having two inputs actuated by said first and second forces respectively and an output movable in proportion to the sum of the inputs;

and means connecting said differential output to said feedback actuated torsion spring.

8. A servo valve mechanism comprising:

a hydraulic motor;

a valve hydraulically connected to said motor with a pair of motor pipes for creating a pressure differential between said pipes to actuate said motor in response to movement of the valve;

means for moving said valve including a signal actuated movable element and a feedback movable element;

a first feedback means movable in response to a first force in one portion of the system and including said motor and valve;

a second feedback means movable in response to a second force in another portion of said system;

a first differential mechanism having two inputs actuated by said first and second forces respectively and an output movable in proportion to the sum of the inputs;

a third feedback means movable in response to a force in a third portion of the system including said motor and valve;

a second differential mechanism having two inputs actuated by the output of said first differential means and said third feedback means respectively and an output movable in proportion to the sum of the inputs to said second differential mechanism;

and means connecting said second differential output to said feedback actuated element.

References Cited by the Examiner
UNITED STATES PATENTS

| | | | |
|---|---|---|---|
| 2,503,447 | 4/1950 | May | 91—365 |
| 2,543,233 | 2/1951 | Dowty | 91—384 |
| 3,015,313 | 1/1962 | Faisandier | 91—365 |

SAMUEL LEVINE, *Primary Examiner.*

FRED E. ENGELTHALER, *Examiner.*